D. L. Pendell.
Tailor's Measure.
Nº 3,130. Patented Jan. 14, 1843.
Fig. 1. Fig. 2.
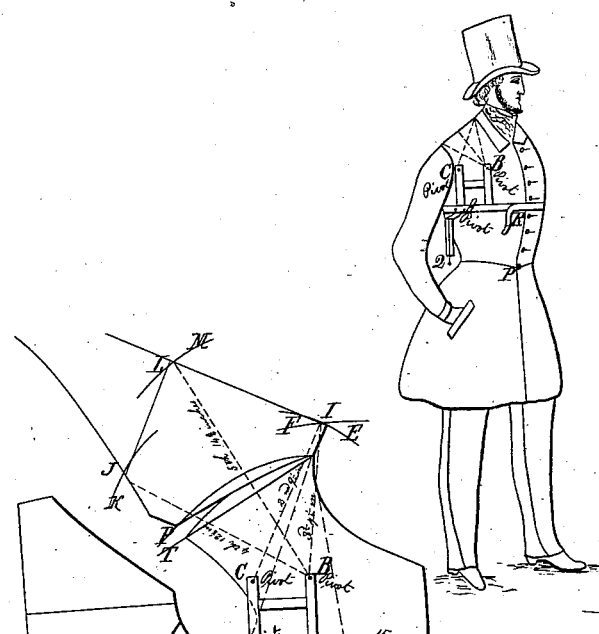
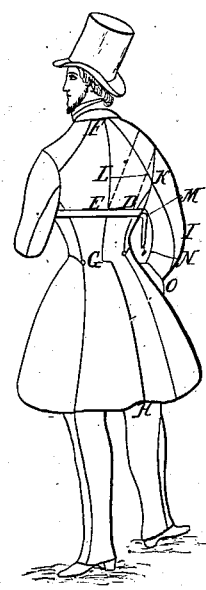
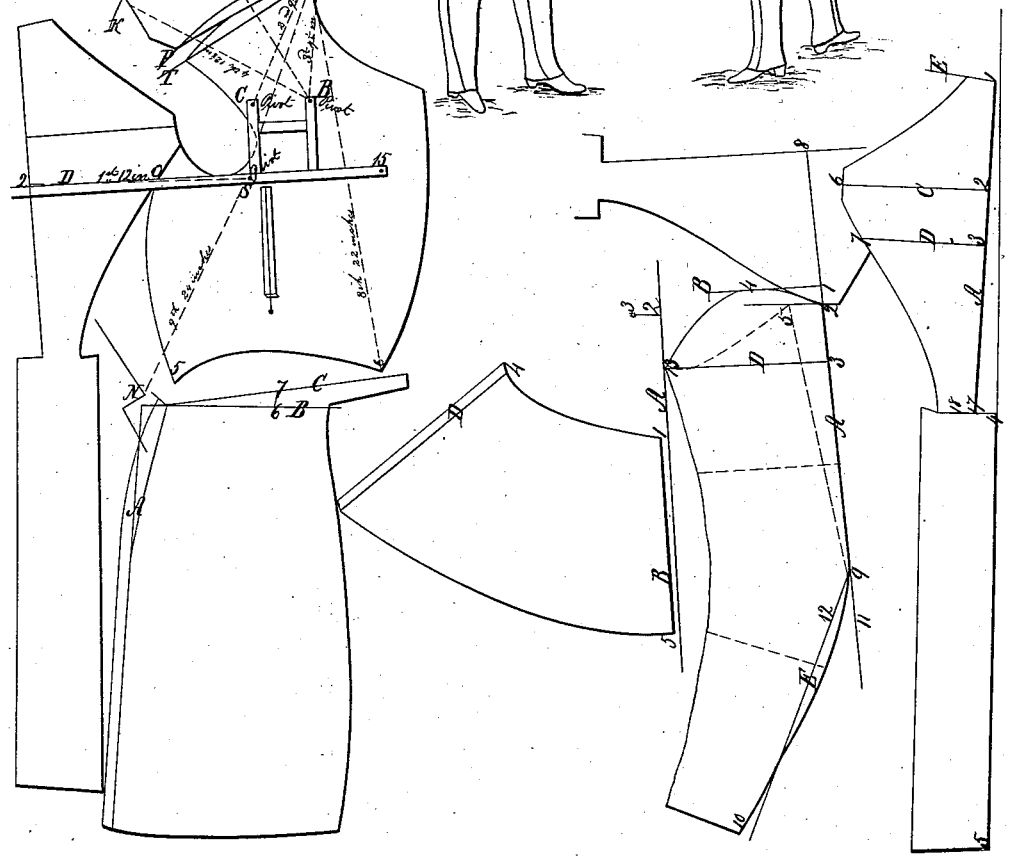

UNITED STATES PATENT OFFICE.

DAVID L. PENDELL, OF GILBOA, NEW YORK.

MEASURING AND CUTTING GARMENTS.

Specification of Letters Patent No. 3,130, dated June 14, 1843.

*To all whom it may concern:*

Be it known that I, DAVID L. PENDELL, of Gilboa, in the county of Schoharie and State of New York, have invented a new and useful Improvement in the Art of Measuring for and Drafting Coats; and I do hereby declare that the following is a full, clear, and exact description of the same, reference being had to the annexed drawings, making a part of this specification, in which—

Figure 1, Plate 1, is a front, Fig. 2, Plate 1, a back view of the same, and the different drafts on plate 2, the manner of applying the measures in drafting coats.

*Explanation of Figs. 1 and 2, Plate 1, and the manner in which the instrument is used in taking the measure for coats, of which the annexed drawing is a representation.*—In the first place the person to be measured is requested to stand in his natural position, and with a piece of chalk mark at F, on Fig. 2, or as high the coat is required in the neck, at the same time at G, on Fig. 2, for length of waist, then fasten the instrument snug around him by means of a leather strap and pivot, as represented by letter R, Fig. 1, taking care to brace it close up under the arm, and close against the front of arm, and horizontally around him by means of the plumb line and ball, see letter Q, Fig. 1. Then proceed to take the following measures with a tape inch measure, to which is attached a piece of brass or other metal, to fit on the pivots: First, from the pivot at A, Fig. 1, measure under the arm, above the instrument, to center of back at E, on Fig. 2, say 12 inches; second, from the pivot at C, Fig. 1, over the shoulder to top of back at F, on Fig. 2, say 9¼ inches; third, from the pivot at B, Fig. 1, over the shoulder, to top of back at F, on Fig. 2, say 9¼ inches; fourth, from the pivot at B, Fig. 1, over the lower point of shoulder to D, at side seam, on Fig. 2, say 12½ inches; fifth, from the pivot at B, Fig. 1, over the center of shoulder to E, at center of back in Fig. 2, say 14¾ inches. Mark at E, with a piece of chalk, and take the instrument off from the person; then proceed to take the remaining measures; sixth, measure from the top of back at F, Fig. 2, to E for a depth of scye, say 8½ inches, to G, for length of waist, say 17 inches, and to H, for length of coat, say 37 inches; seventh, from L, on Fig. 2, to K, for width of back, say 7¼ inches, to I, for length of sleeve to elbow, say 22 inches, and to O, for length of sleeve, say 35 inches, around the arm at M, say 11½ inches, at N, say 11½ inches and around the hand at O, say 9 inches, for size of sleeve ; eighth, from the top of back at F, Fig. 2, over the shoulder to P, Fig. 1, for length of waist in front, say 22 inches; ninth, from the top of back at F, Fig. 2, around the front of arm to G, for balance of coat at waist, say 24 inches; tenth, around the breast and waist, say 35 and 29 inches.

*Explanation to draft Plate 2.*—Copy of the measure as taken: 1st (12), 2nd (9¼), 3d (9¼), 4th (12½), 5th (14¾), 6th (8½ 17 37), 7th (7¼ 22 35 11½ 11½ 9), 8th (22), 9th (24), 10th (35 29).

*Explanation to back.*—First draw line A for back seam bringing it in waist from 4 to 17, 2 inches, apply the 6th measure from 1 to 3, 8½ inches; do. to 17, 17 inches; do. to 5, 37 inches. Measure up from 3 to 2 for line C, from 1¼ to 3 inches, according to the size of the person measured. Measure from 17 to 18, 1¼ inches. Place the corner of square at 1, the long arm extending down to 18, and draw line E, for top of back. From 3, square line D. From 2, square line C, and measure out from 2 to 6, the 7th measure, 7¼ inches. The remainder of back can be formed to suit the fashion or fancy.

*Explanation to fore part.*—Lay the back in whatever position the fore part can be got out to the best advantage. First, mark side seam by the back, as far as the depth of scye at 7. Next draw line D, from the back across the fore part for depth of scye. You now apply the first measure from 2 to 3—for front of scye—12 inches. You next take the instrument and place it as represented on draft, Plate 2, care being taken to have the pivot at S, touch at Fig. 3, and to have the instrument even on line D, then proceed to apply the second measure, from pivot C to I, 9¼ inches, and cast curve E. Apply the 3d measure from pivot B to I, 9¼ inches, and cast curve F. Apply the 4th measure from pivot B to J, 12¼ inches, and cast curve K. Apply the 5th measure, from pivot B to L, 14¾ inches, and cast curve M. Remove the instrument, and take the back and place the top of it at 1, wherever curves F, and E cross each other, letting the depth of scye at 3 and 7, touch at curves K and M, while in this position mark shoulder seam, neck gorge, and scye. Next apply the ninth measure from I to N, 24 inches, and mark it. Then with the forefinger of the right hand placed at O, bring the bottom of back at N, to the mark made for the ninth measure, and form side seam by the back. After getting the length of side seam, apply the 8th measure from I, at the top of back, to 6 for length of fore part in front, 22 inches. Then apply one half of the 10th measure from N to 6, 14½ inches, for size around the waist. Form bottom of fore part. The front of breast measure from 2 to 15, one half of the 10th measure, 17½ inches, and add to this 2¼ inches. Form breasts. When the person measured is well formed the top of back at I, and the depth of scye at 3 and 7, will touch on curves E, F, M and K, but it happens in some shapes, that the 5th measure from pivot B, to letter L, will vary from one half to three fourths of an inch, by being thus much too short or long, according to the form of the person's shoulders. When this is the case, the top of back at I, and the depth of scye at 7, must touch the curves at their respective places, as represented on draft. The 5th measure from pivot B, to letter L, is made to touch at curve M, by taking from or adding to the shoulder seam, as the case may be. For instance, if the depth of scye at 3, does not touch on curve M, by its being one half an inch beyond the curve M, then the curve of shoulder seam on back should be cut ¼ of an inch deeper, and ¼ of an inch taken from the round of shoulder seam on fore part, as represented by line P and T on draft. If the depth of scye at 3, should fall short of touching on curve M, then cut the shoulder seam, on fore part a little more rounding, but not to vary it as much as if the depth of scye at 3, should go beyond the curve, as the cloth over the shoulder where the 5th measure is taken is generally biasing, and will readily give so as to fit the place.

*Explanation to the drafting of skirt.—* Line A, represents a line drawn in from the edge of cloth sufficient for the plait; draw line B, square with line A. Measure from line A, on line B, to 6, 10 inches. Measure from 6 to 7, 2 inches and draw line C. The remainder of skirt is formed to fashion or fancy. If the person measured should be of a crooked form, the distance from 6 to 7 should be lessened from ⅛ to ½ an inch according to the deformity of the person.

*Explanation to the drafting of sleeve.—* Line A represents the edge of cloth, line B the top of cloth; measure from 1 to 2, from ¾ to 1¼ inches according to the size of the person measured. Next apply the back at 2, as represented by draft, and measure from 8 to 3, the first measure, 12 inches, lacking 1¼ inches; continue the measure down to 9 and apply the 7th measure, 22 inches; continue the measure down to 10, and apply the 7th measure, 35 inches. Measure from 9 down on line A to 11, 5 inches; from 11 to 12 square with line A, 2 inches, and draw line E, for bend of arm. Square line D. Measure out on line D, from 3 to 13, one half the scye including the back. Measure from 1 to 4, from 2 to 3 inches, according to the size of the person measured. Sweep from 13 to 4 by the distance from 13 to 3. Sweep from 2 to 4, by the distance from 1 to 3 lacking one inch. The remainder form to measure. For the under side sleeve, measure from 13 to 5, the distance from 13 to 3 lacking ½ an inch.

*Explanation to the drafting frock coat skirt.—* Line A represents the edge of cloth, line B the front of skirt, which is carried in from the edge of cloth sufficient for the inturn. From 1 to 5, is the length of the skirt. Measure from 1 to 2 on line A, one half of the 10th measure, 14½ inches. Measure from 2 to 3, 3 inches. Sweep from 1 to 4 by 3, draw line D, for fullness of skirt according to fashion or fancy. The bottom is got by measuring around the same distance from 1 to 5.

What I claim as my invention, and desire to secure by Letters Patent is,

1. An improvement in the art of cutting by the application of two measures in the manner set forth, in measuring for and drafting coats, and the manner in which a third is taken, viz, with a tape inch measure.

2. I claim as one of the two measures above spoken of, that which is taken from the pivot at B, on Fig. 1, over the lower point of shoulder to side seam at D, Fig. 2, Plate 1, the application of which may be seen, by referring to Plate 2, from the pivot at B, to letter J in drafting coats. I claim as the other of the two measures above spoken of, that which is taken from pivot at B, Fig. 1, over the center of shoulder to center of back at E, on Fig. 2, Plate 1, the application of which may be seen on Plate 2, from pivot B, to letter L, in drafting coats. I claim the third measure above spoken of as being taken with a tape inch measure, from the pivot at A on Fig. 1, under the arm to center of back at E, on Fig. 2, the application of which may be seen by referring to Plate 2 from 2 on back to 3 in front of scye in drafting. The two measures and the manner of taking the third as above spoken of I claim as my invention, and desire to secure by Letters Patent.

The benefit arising from taking and applying these measures in cutting coats are: First, they are taken over those places where the human shape is more or less deformed. Second, they are taken from and to such places that the deformity if any exists must of necessity come under the direct influence of the measure. I would respectfully solicit your attention particularly to the point from which the two following measures are taken, viz., from the pivot at B, Fig. 1, Plate 1, in measuring, and from pivot B, Plate 2, in drafting, for in this is one grand feature of my improvement. By referring to Plates 1 and 2, it will be seen that from this point is the most accurate place of starting to take these measures, more so than any other which can be found, as from this the different variations in shape come under the measure when taken; consequently if the person measured has hollow, very high, low, or good shaped shoulders by adhering to the directions as given above in drafting all difficulties will be removed and the coat fitted to the shape of the person. Third, by using a tape inch measure to take the third measure above described, viz., from pivot A, Fig. 1, to the center of back at E, Fig. 2, Plate 1, the distance is obtained with an exactness not found by using any metallic substance, hence if the person measured should have a hollow or hunch back the exact measure is taken and applied in drafting. Fourth, the measures I claim combined with the whole render it a self-varying system, in every sense of the term, for it not only varies the fore part to the shape of the back, but also to the shape of the person measuring; therefore your petitioner prays that Letters Patent may be granted to him for his claim.

DAVID L. PENDELL.

Witnesses:
 NORTON RAYMOND,
 THOMAS E. FURO.